United States Patent [19]
Ulrich

[11] Patent Number: 5,917,487
[45] Date of Patent: Jun. 29, 1999

[54] DATA-DRIVEN METHOD AND SYSTEM FOR DRAWING USER INTERFACE OBJECTS

[75] Inventor: Robert Ulrich, Mountain View, Calif.

[73] Assignee: Apple Computer, Inc., Cupertino, Calif.

[21] Appl. No.: 08/644,361

[22] Filed: May 10, 1996

[51] Int. Cl.$^6$ .................................................. G06F 15/00
[52] U.S. Cl. ........................................................ 345/340
[58] Field of Search ................................. 345/433, 441, 345/340, 342

[56] References Cited

U.S. PATENT DOCUMENTS

| | | | |
|---|---|---|---|
| 4,866,638 | 9/1989 | Cosentino et al. | 395/155 |
| 5,101,364 | 3/1992 | Davenport et al. | 395/155 |
| 5,121,478 | 6/1992 | Rao | 395/157 |
| 5,363,482 | 11/1994 | Victor et al. | 395/157 |
| 5,371,844 | 12/1994 | Andrew et al. | 395/155 |
| 5,452,406 | 9/1995 | Butler et al. | 395/126 |
| 5,485,600 | 1/1996 | Joseph et al. | 395/500 |
| 5,731,813 | 3/1998 | O'Rourke et al. | 345/349 |

FOREIGN PATENT DOCUMENTS 0 561 517  9/1993  European Pat. Off. .

OTHER PUBLICATIONS

D. Moskowitz et al., "OS.2 2.1 Unleashed", pp. 152–157, 193 & 222–229 (1993).
S. Levenson et al., "Now That I Have OS/2®2.0 On My Computer, Wha Do I Do Now?", pp. 11–13 (1992).
IBM Technical Disclosure Bulletin, "User Interface Technique for Selecting Multiple Interface Themes", vol. 37, No. 3, pp. 635–638 (Mar. 1994).
IBM: "OS/2 2.0 Presentation Manager Graphics Programming Guide", 5–1, 5–5 and 7–1, 7–9 (Mar. 1992).
Thomas Burge et al., "Advanced OS/2™ Presentation Manager Programming", pp. 139–143 (1993).
Yiing, D., et al., Computer Graphics Forum 4, Arbitrary Area Filing in a Fast Procedure, pp. 363–370 (1985).
Shinde, Y., et al., Computer Graphics Forum 5, Algorithms for Handling the Fill Area Primitive of GKS, pp. 105–117 (1986).
Gourret, J.P., et al., Irregular Polygon Fill Using Contour Encoding, pp. 317–325 (undated).
Roberts, W. et al., Computer Graphics Forum 7, First Impression of NeWS, pp. 39–57 (1988).
Myers, B., et al., ACM vol. 20, No. 4, Creating Highly--Interactive and Graphical User Interface by Demonstration, pp. 249–258 (1986).
Brassel., K. et al., Computer Graphics, vol. 13, No. 2, An Algorithm for Shading of Regions on Vector Display Devices, pp. 126–133 (1979).
Lipkie, D., et al., Computer Graphics, vol. 16, No. 3, Star Graphics: An Object–Oriented Implementation, pp. 115–124 (1982).
Lieberman, H., Computer Graphics, vol. 19, No. 3, There's More to Menu System Than Meets the Screen, pp. 181–190 (1985).
Pavlidis, T., Computer Graphics, vol. 15, No. 3, Contour Filing in Raster Graphics, pp. 29–36 (1981).

*Primary Examiner*—Phu K. Nguyen
*Attorney, Agent, or Firm*—Burns, Doane, Swecker & Mathis, L.L.P.

[57] ABSTRACT

Systems and methods for drawing objects on a display and, in particular, on a graphical user interface are described. Arbitrarily sized objects having straight sides and arbitrarily shaped corners can be drawn using one or more concentric rings which enclose an optional face. Each ring is specified as part of a data structure in terms of position, fill pattern and bits to be turned on. As a result, changes to the object's appearance attributes, such as, size, shape and color, can be made without requiring new program code.

39 Claims, 12 Drawing Sheets

Ring Level 0
Color Index = Black
Ring Bits = $7F7F7F7F

Ring Level 1
Color Index = Dark Shadow
Ring Bits = $007FFF00

Ring Level 1
Color Index = Shadow Corner
Ring Bits = $00800080

Ring Level 1
Color Index = Hilight
Ring Bits = $FF00007F

Face
Color Index = Interior Color

Finished Icon Button
Frame

FIH. 6H

DATA-DRIVEN METHOD AND SYSTEM FOR DRAWING USER INTERFACE OBJECTS

RELATED APPLICATIONS

This application is related to U.S. patent application Ser. No. 08/242,963 entitled "Pattern and Color Abstraction in a Graphical User Interface", U.S. patent application Ser. No. 08/243,368 entitled "Switching Between Appearance/Behavior Themes in Graphical User Interfaces" and U.S. patent application Ser. No. 08/243,327 entitled "A System and Method for Customizing Appearance and Behavior of Graphical User Interfaces", all of which were filed on May 16, 1994 and all of which are hereby incorporated by reference. This application is also related to U.S. patent application Ser. No. 08/644,360, entitled "A Data Driven Layout Engine", to Ruff et al., filed on May 10, 1996, the disclosure of which is also incorporated by reference.

COPYRIGHT NOTICE

A portion of the disclosure of this patent document contains material which is subject to copyright protection. The copyright owner has no objection to the facsimile reproduction of the patent disclosure as it appears in the Patent and Trademark Office patent file or records, but otherwise reserves all copyright rights whatsoever.

BACKGROUND

The present invention relates generally to displays and graphical user interfaces for computer systems. More particularly, the present invention relates to systems and methods for drawing objects on displays and in graphical user interfaces.

The evolution of the computer industry is unparalleled in its rate of growth and complexity. Personal computers, for example, which began as little more than calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable even by those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

One type of GUI is based on a visual metaphor which uses a monitor screen as a work surface called a "desktop" where documents are presented in relocatable regions termed "windows". The user interacts with the computer by, for example, moving objects on the desktop, choosing commands from menus, and manipulating window controls, such as checkboxes and scroll bars. An exemplary desktop screen is reproduced as FIG. 1.

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these new resources at their disposal, application designers, and others, desire more and more control over the appearance and behavior of the GUI, including the desktop environment and, in particular, objects on the desktop.

Described in the above identified related patent applications, are techniques for creating different themes for the desktop environment. More specifically, these themes provide coordinated sets of appearance and behavior attributes for objects drawn on the desktop. Users can change themes by, for example, making a menu selection in an appearance control menu. The appearance management system responds by drawing objects using the stored representations of those objects associated with the selected theme. Exemplary themes which can be created using these techniques are shown in FIGS. 2B and 2C for the conventional user interface appearance illustrated in FIG. 2A.

One aspect of drawing objects on graphical user interfaces relates to the creation of objects, e.g., push buttons, which give the user a visual impression that the object has height relative to a "surface" of the desktop. These types of objects have historically been created by drawing concentric rings or rectangles having predetermined shadings designed to provide such an impression. An example of this conventional technique is found in U.S. Pat. No. 5,452,406 to Butler et al. Typically, these types of objects have been drawn on a display using hard-coded techniques, i.e, by providing program code to draw each concentric ring or rectangle on a line-by-line basis at the predetermined color or luminance desired to visually convey the sense of height desired for the object. As a simplified example, such program code might follow the pattern of:

```
Calculate Rect (Top, Left, Bottom, Right);
    Set Pen Color = Black;
    Move to (Left, Bottom -1);
    Draw Line to (Left, Top +1);
    Move to (Left + 1, Top);
    Draw Line to (Right -1, Top); . . . etc.
```

One significant drawback of such hard coded techniques is their lack of flexibility, particularly when implementing an interface in which the user is able to switch between different themes. For example, a first theme might specify that a certain push button is drawn in a rectangular shape at a particular size, while a second theme might specify that same button as rounded and having a smaller size. Using conventional hard-coded techniques, new program code would typically be needed for each push button. Developing new code for each theme object would probably add significantly to the complexity and cost of developing and implementing new themes.

SUMMARY

According to exemplary embodiments of the present invention, these and other drawbacks and limitations of conventional techniques for drawing objects are overcome by using a data-driven methodology. According to one exemplary embodiment of the present invention, objects are drawn using data provided in frame data structures. Each frame data structure includes one or more ring specifications, which provide data that can be used to draw one or more rings relative to a reference. Preferably, for each color or pattern used within a ring, a separate ring specification is provided for the frame. Each ring specification can describe, among other things, a position of that ring with respect to a reference, the color or pattern associated with pixels to be filled in for that ring or ring portion and a pixel identifier which identifies those pixels within the ring to be filled in (i.e., drawn using that color or pattern).

According to exemplary embodiments, each ring specification can specify that any of a plurality of pixels, including corner pixels and side pixels, are to be filled in. The corner pixels can be individually specified by a corresponding bit within the ring specification. This permits the shape of the object specified by the frame to be altered without requiring new program code, i.e., by changing bits in the data structure. Each set of side pixels, on the other hand, can be jointly specified by a single side bit, e.g., four side bits for four sides of a generally rectangular ring. Thus, preferably for each set of side pixels in a ring, the pixels are either all filled in or all unfilled. When the composite object specified by the frame needs to be grown or shrunk, the side bits will represent more or fewer pixels. In this way, the size of the object specified by the frame can be adjusted without requiring new program code.

According to other exemplary embodiments of the present invention, a color threshold can be provided whereby the ring specification can be drawn in one of two or more modes depending upon the number of colors available with which to draw the object on the display. For example, if more than 256 colors are available for rendering the object on a display then a first ring specification can be used, and if fewer than 256 colors are available then a second ring specification can be used. This allows the theme designer to decide how to provide the desired visual impression given the color capabilities of the system on which the object is to be drawn.

BRIEF DESCRIPTION OF THE DRAWINGS

The foregoing, and other, objects, features and advantages of the present invention will be more readily understood by those skilled in the art upon reading the following detailed description in conjunction with the drawings in which:

FIG. 5A illustrates an exemplary numbering scheme for a 64-bit ring;

FIG. 5B illustrates an exemplary numbering scheme for a 32-bit ring;

FIGS. 6G–6J illustrate representations of ring structures and corresponding objects as they can be drawn using those ring structures;

DETAILED DESCRIPTION

The present invention is described herein by way of exemplary, illustrative embodiments, some of which use the Macintosh® computer system as a reference for explaining the present invention. However, those skilled in the art will readily appreciate that systems and methods according to the present invention can be applied to any type of display system having a user interface. Further, while push button objects are used to illustrate how exemplary embodiments of the present invention draw objects or are used to draw objects, those skilled in the art will recognize that the present invention can be used to draw objects having arbitrary length, straight sides and arbitrarily shaped corners including, but not limited to, icons, focus rings, dialog group, separator lines and window headers.

Figure 1:
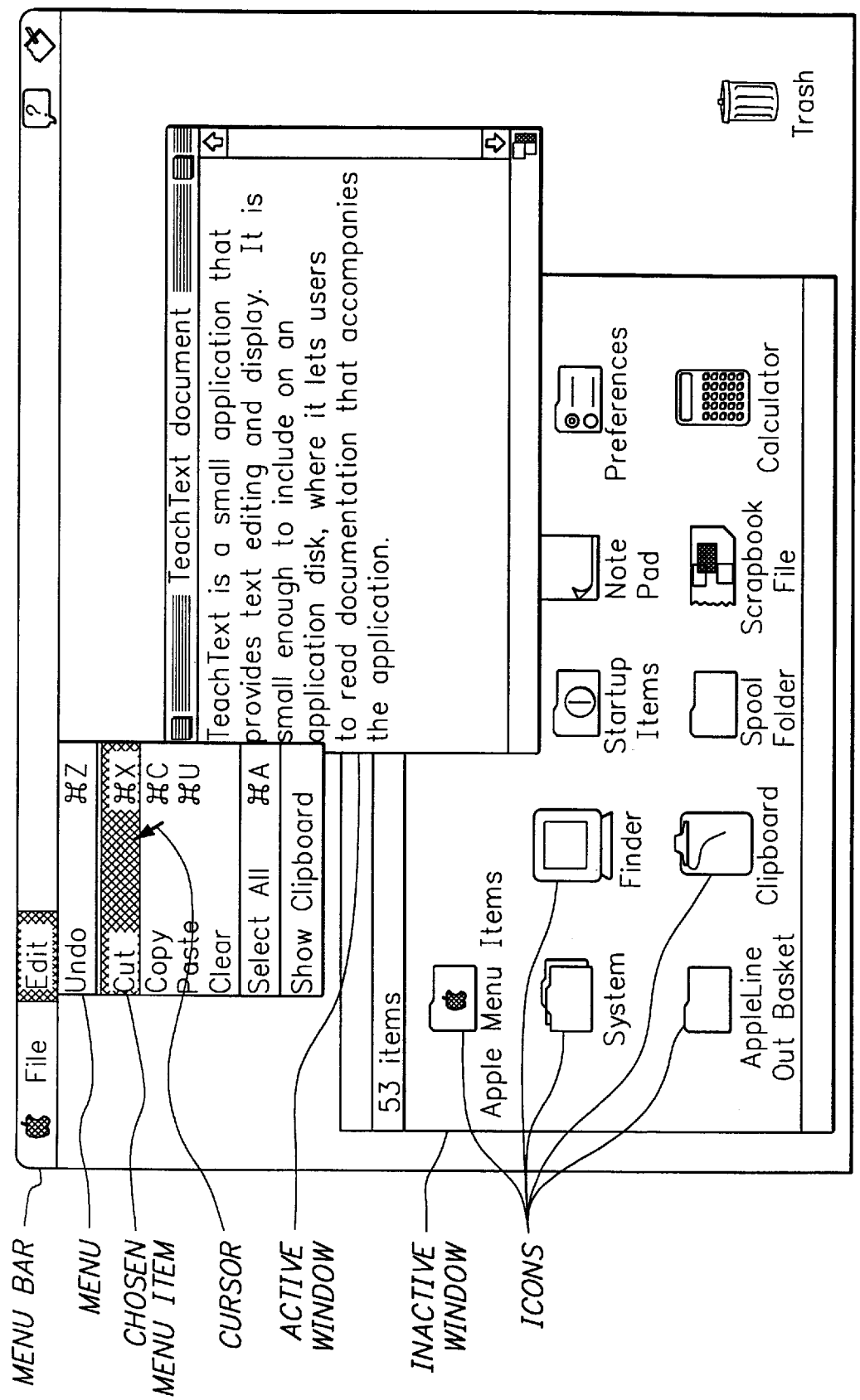
FIG. 1 shows a conventional desktop screen.
Figure 2A:
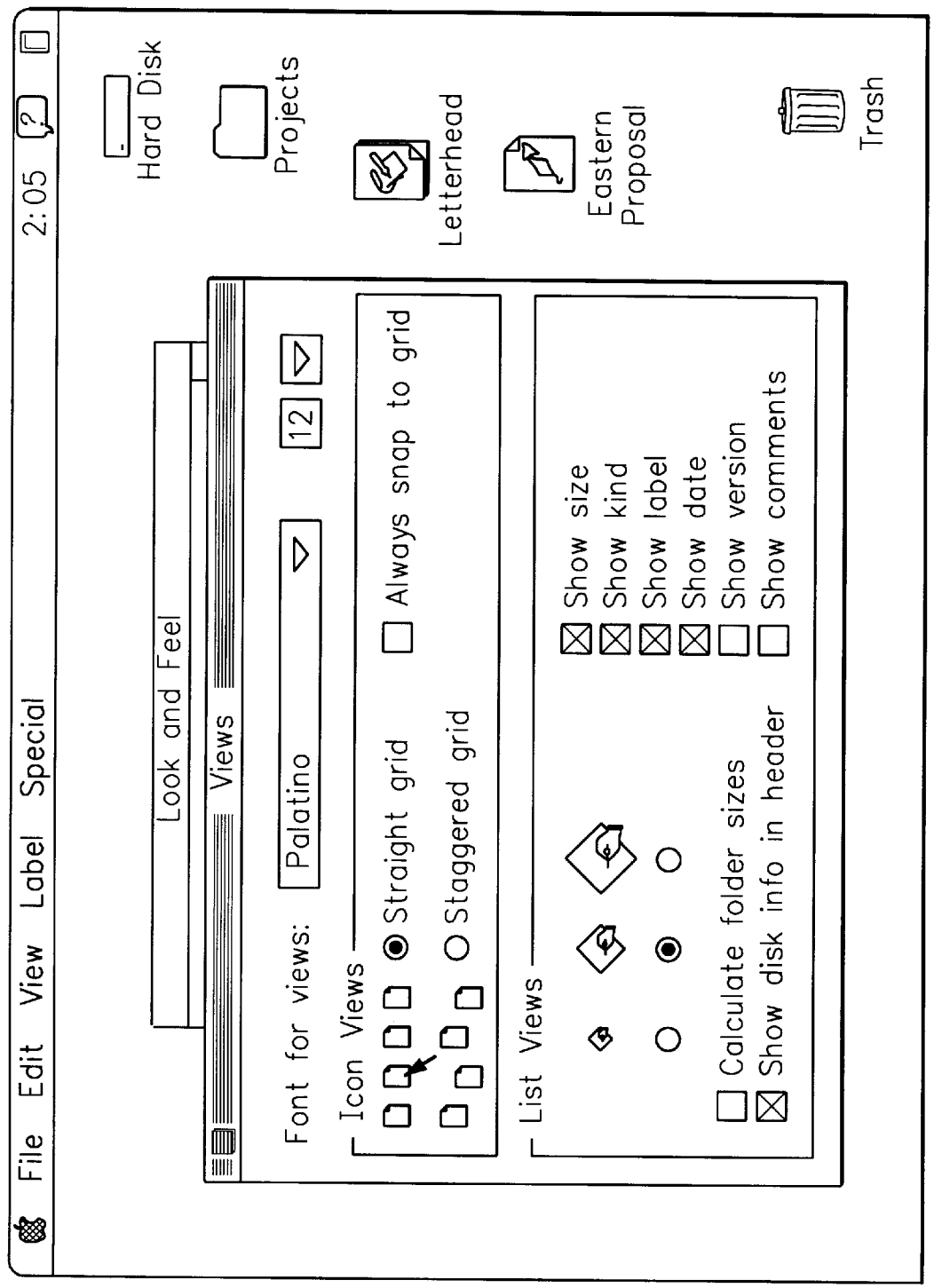
FIG. 2A illustrates a conventional user interface.
Figure 2B:
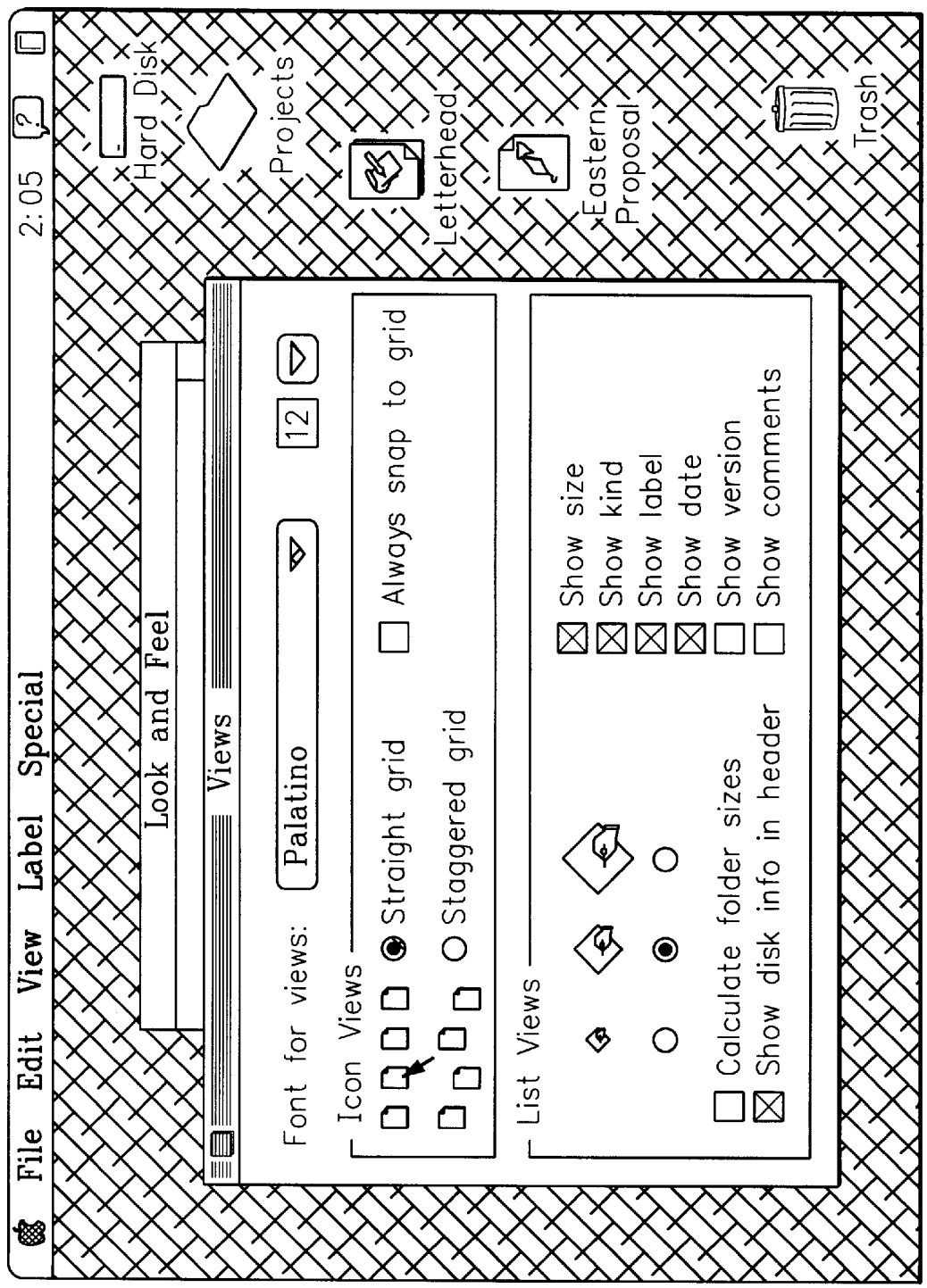
FIG. 2B illustrates the user interface of FIG. 2A operating under a theme according to an exemplary embodiment of the present invention.
Figure 2C:
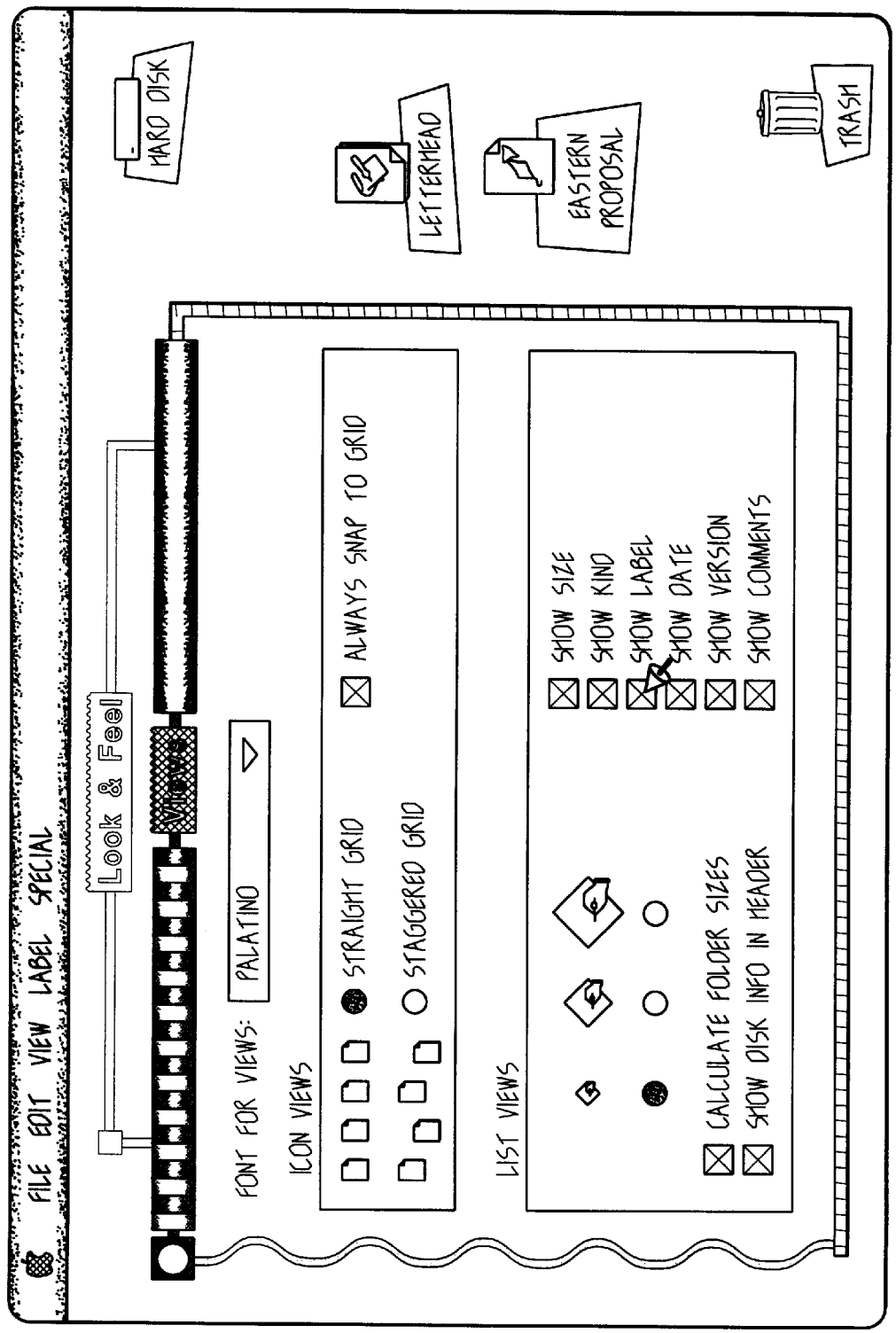
FIG. 2C illustrates the user interface of FIG. 2A operating under a second theme according to another exemplary embodiment of the present invention.
Figure 3:
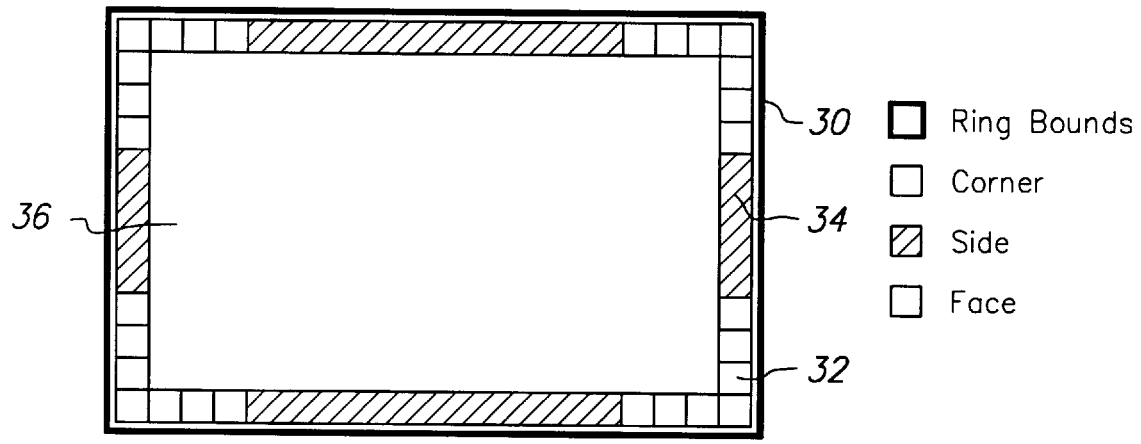
FIG. 3 is a graphical representation of a frame according to an exemplary embodiment of the present invention.

Exemplary embodiments of the present invention provide techniques and data structures for drawing such objects on a display or user interface. Certain terminology is used throughout this disclosure to refer to various aspects of the inventive techniques, which terminology will now be described with reference to FIG. 3. Therein a reference shape 30 is illustrated by the bold outer line. The reference shape 30 establishes the location on the display at which the object is to be drawn. Although the reference shape 30 is, in these exemplary embodiments, a rectangle, those skilled in the art will appreciate that reference shapes other than a rectangle could be used. Also seen in FIG. 3 are edge or corner pixels 32 and side portions 34. Together, the four sets of corner pixels 32 and four side portions 34 form a "ring". One or more rings make up a "frame". The inner portion 36 of the frame is referred to herein as the "face" of the object. Pixels and faces can be selectively filled in (i.e., drawn) with an identified "pattern", which term refers to repeating multi-pixel color sequences and is inclusive of solid RGB colors.

Figure 4:
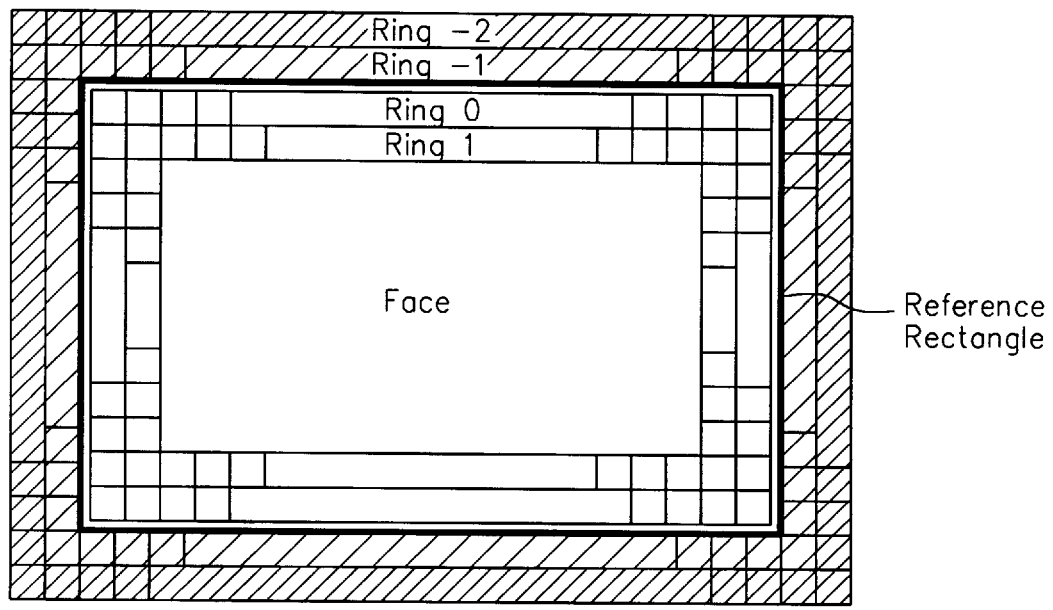
FIG. 4 is a representation of another exemplary frame which illustrates rings both inside and outside a reference rectangle.

FIG. 4 shows another example of a frame which includes four rings. In this frame, two of the rings (Ring 0 and Ring 1) are positioned inside the reference rectangle, while two of the rings (Ring –1 and Ring –2) are positioned outside the reference rectangle. The choice of where rings are placed relative to the reference rectangle is made by the theme designer based upon the desired visual impression for a particular object. Although unnumbered in FIG. 4, it can be seen that each ring includes a plurality of corner pixels which are separated from other corner pixels in the same ring by side portions. In particular, it should be noted, and will be explained in more detail below, that the side portions of a given ring are shorter than the side portions of respective outer rings. For example, Ring 1 has shorter side portions than Ring 0, which has shorter side portions than Ring −1, which has shorter side portions than Ring −2.

Figures 5A, 5B:
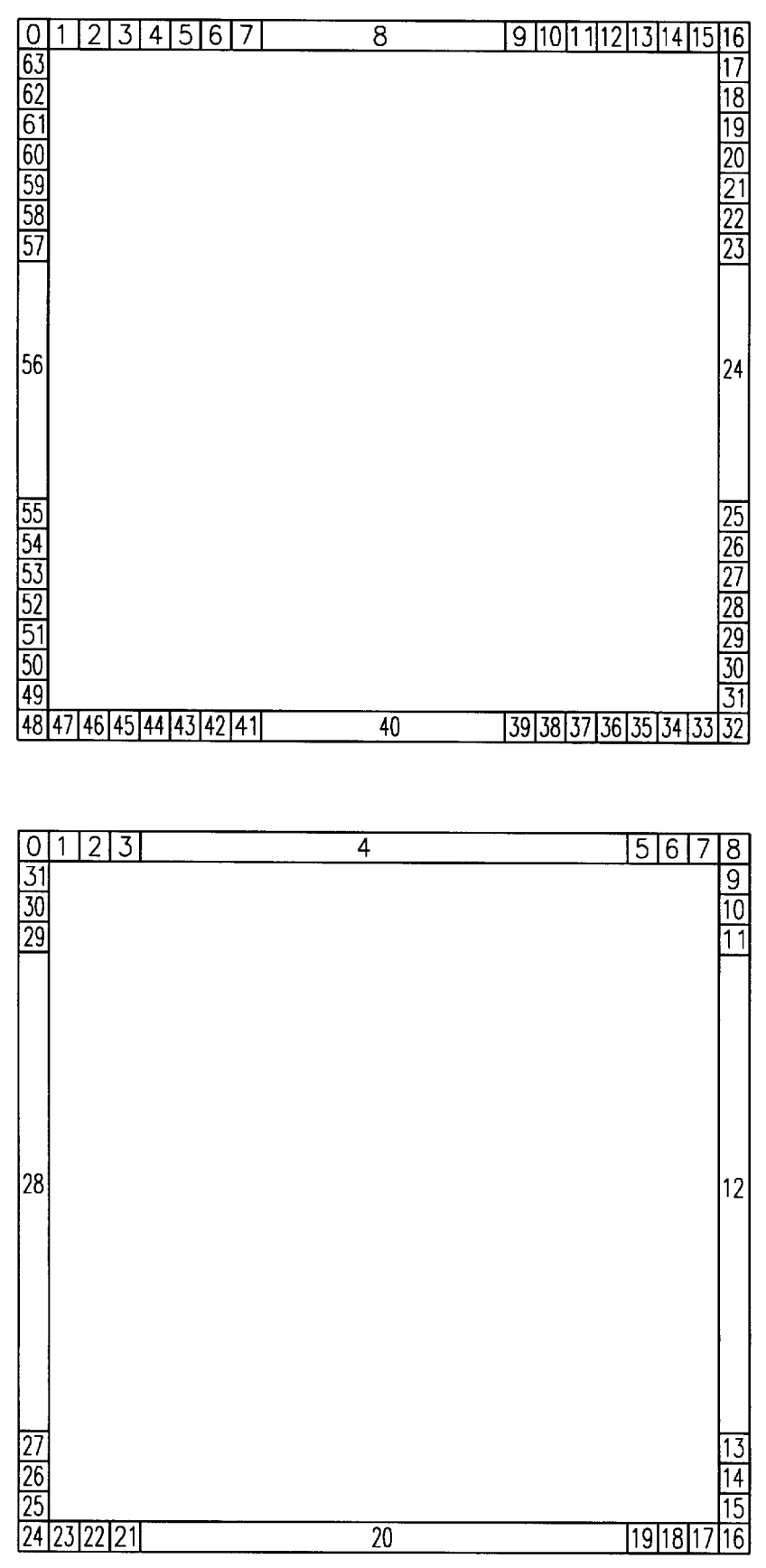
Figure 5C:
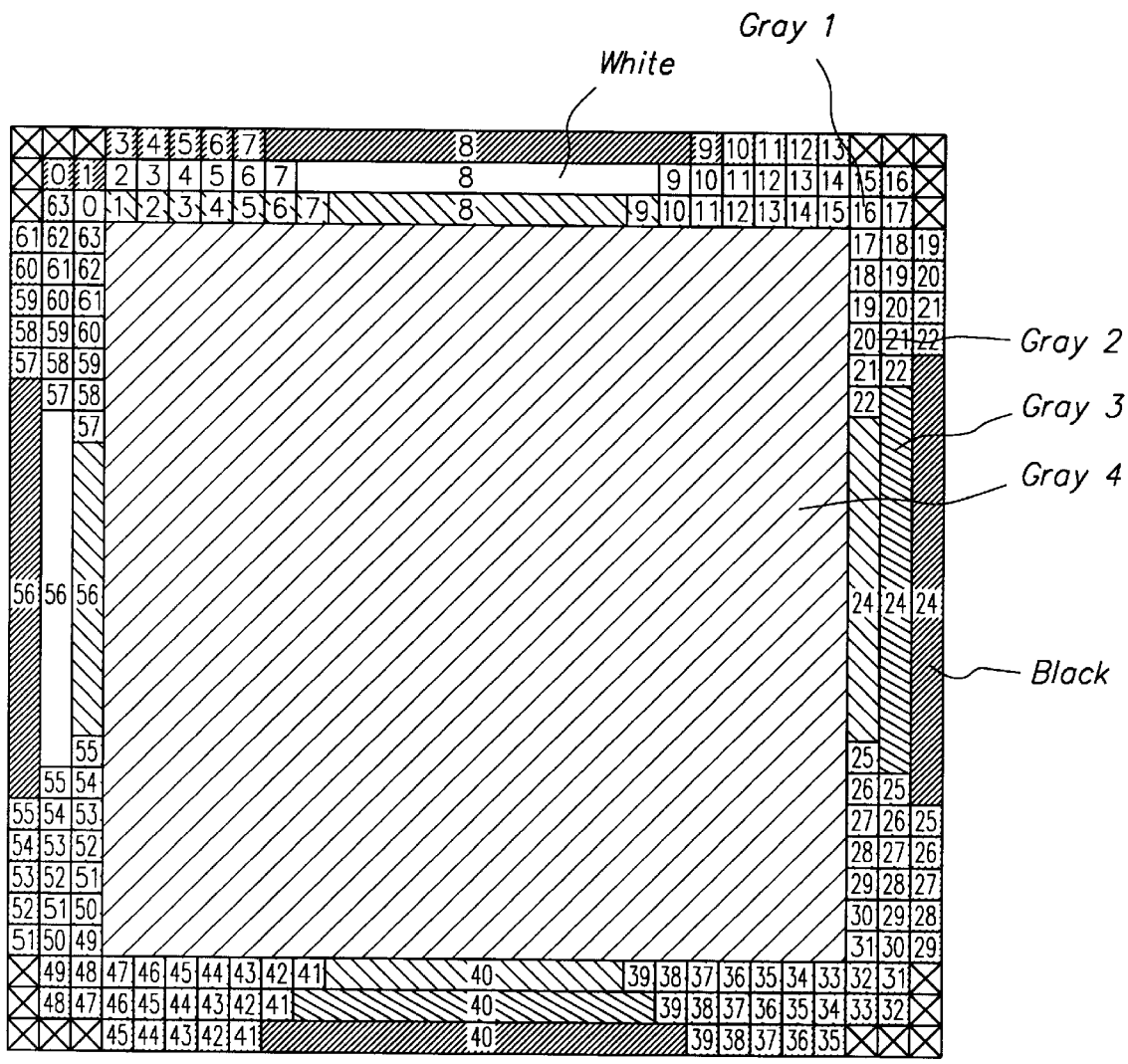
FIG. 5C illustrates yet another frame wherein an exemplary numbering scheme used to associate pixels in each ring with bits in a pixel identifier is shown.

Turning now to FIGS. 5A–5C, more detailed examples which illustrate the correspondence between pixels within each ring and bits in a pixel identifier will now be described. FIGS. 5A and 5B depict exemplary numbering schemes for 64 bit and 32 bit rings, respectively. In FIG. 5A, the corner pixels are individually associated with bits 0–7, 9–23, 25–39, 41–55 and 57–63, while the side pixels are grouped together such that side bits 8, 24, 40 and 56 each represent a group of side pixels. Similarly, in FIG. 5B, corner pixels are specified by bits 0–3, 5–11, 13–19, 21–27 and 29–31, while the sides are specified by bits 4, 12, 20 and 28. The numbering scheme associates bits in a data structure with corresponding pixels in the ring. In this way, it can be indicated within the data structure whether or not certain pixels within the ring are to be filled in using a pattern identified in the ring specification.

In FIG. 5C, three concentric rings are illustrated with their pixel numbering and fill patterns. In this example each ring is specified by 64 bits. Note that certain pixels, e.g., those associated with bits 14–18 of the outermost ring, are illustrated as unfilled and will, accordingly, not be identified by the pixel identifier associated with that ring. Of course, those skilled in the art will appreciate that the numbering schemes illustrated in FIGS. 5A–5C are purely illustrative and could be modified to suit any particular design constraints. For example, the numbering scheme could begin with the most significant bit in the lower left hand corner of the ring illustrated in FIGS. 5A–5C instead of the upper left hand corner.

As seen in each of FIGS. 3, 4 and 5A–5C, rings specify individually a plurality of pixels associated with each corner region, and specify pixels between each corner region as a group. This feature of the present invention provides a number of advantages in terms of providing a single data structure which allows a theme designer to specify many differently appearing objects. For example, individually specifying the pixels in the corner region provides the capability of easily changing the shape of the object specified by the frame data structure. Note that, in the exemplary push button object of FIG. 5C, rounded corners have been created by selectively filling in only some of the corner pixels. For example, in the outer ring, pixels 0, 1, 2, 62 and 63 have not been filled in. This provides curvature to the corner defined by the filled pixels 3 and 61 in the outer ring and pixels 0, 1 and 63 in the second outermost ring. As will be appreciated from this example, more or less curvature can be made available to objects drawn according to the present invention by providing more or fewer corner pixels to the ring specification. For example, the object of FIG. 5, wherein each ring is specified using 64 bits, could have been defined using 32 bits for each ring wherein each corner has seven individually specified pixels if less curvature was deemed necessary by the theme designer.

Another advantage associated with techniques and data structures according to the present invention is that resulting objects can be grown or shrunk. As an object is grown, the number of pixels represented by the side bits increases proportionally. Similarly, when an object is shrunk the side bits are interpreted to represent fewer bits. Having described graphically how objects are created using rings which are specified as a plurality of corner pixels and side portions, an exemplary frame data structure for holding this information will now be described.

```
Frame Data Structure
    byte;                      // color threshold
    // Ring Specs for Above Color Threshold
    byte;                      // face flags
    byte;                      // min inset
    byte;                      // max inset
    integer; Number            // face patterns
    integer = FirstRingSpec;
    array FirstRingSpec
    {
        byte;                  // alignment flags
        byte;                  // inset
        integer;               // fill pattern
        unsigned hex longint;      // topLeft bits
        unsigned hex longint;      // botRight bits
    // Ring Specs for Below Color Threshold
    }
    byte;                      // face flags
    byte;                      // min inset
    byte;                      // max inset
    integer;                   // face pattern
    integer = Number Of (SecondRingSpecs);
    array SecondRingSpec
    {
        byte;                  // alignment flags
        byte;                  // inset
        integer;               // fillpattern
        unsigned hex longint;      // topLeft bits
        unsigned hex longint;      // botRight bits
    };
```

In the above exemplary data structure, a frame is specified which can be used to draw a single ring. However, two ring specifications are provided because, according to exemplary embodiments of the present invention, a frame data structure can include alternative ring specifications for each ring whereby different levels of system color capability are independently supported. This allows a designer to create different geometries for an object that takes advantage of a system's color capabilities. For example, in the frame data structure described above, a first set of ring specifications could be used in systems which support a large color set. The second set of ring specifications could be used for systems which have a smaller color set. If, for example, the color threshold parameter in the data structure is set to 256 and 256 or more colors are available on the system, then the first set of ring specifications will be used. If, on the other hand, the same object is to be drawn on a system which supports fewer than 256 colors, then the second set of ring specifications will be used. Those skilled in the art will appreciate that more than two sets of alternative ring specifications can be provided to allow a designer to create objects differently for more than two sets of color capabilities. Similarly, the number of system-supported colors which is used as a threshold to determine which set of alternative ring specifications is used can be selected as desired. This threshold can be specified in the above-described data structure as the color threshold parameter which has a value equal to the threshold number of color bits supported by the system, e.g., a value of eight indicates a threshold of $2^8$ =256 colors. Although each alternative set of ring specifications may have different parameter values, the parameters themselves are generally the same and are, therefore, described generically below.

In each set of ring specifications, a plurality of face flags are first specified. These face flags specify the alignment of the pattern (if any) used to fill the face. As described below, there may be certain situations in which the object designer chooses not to fill in the object's face. Next, the minimum inset and maximum inset parameters are specified. These inset values indicate the number of rings within the frame which are outside of the reference rectangle and the number of rings which are inside the reference rectangle, respectively. For example, in the exemplary frame of FIG. 4, the minimum inset would be equal to 2 and the maximum inset would be equal to 2. The specification of these inset values within the frame data structure can be used, for example, to calculate boundaries and face size prior to traversing the list of ring specifications. For example, the face size is determined based upon the maximum indent applied to the boundaries.

Next, the face pattern is specified. This parameter identifies the color or pattern (if any) that will be used to fill in the face after the rings have been created. Optionally, the face can be specified as unfilled to provide an empty area which can, for example, enclose the reference shape for another frame. Continuing down in the exemplary frame data structure, the number of ring specifications in the set of ring specifications is given so that when the system processor operates on the frame data structure, it will know how many iterations of the ring drawing procedure will be made.

After these preliminary parameters will follow one or more ring specifications in each set. The exemplary frame data structure provided above only illustrates a single ring specification in each set for purposes of clarity. However, an object can be drawn using any number of rings and each ring will have associated therewith at least one ring specification in the frame data structure. For rings having more than one color or pattern, a separate ring specification is provided for each color or pattern. For example, considering the exemplary rings of FIG. 5C, the second outermost ring would contain three ring specifications at that indent level.

The ring flags indicate the orientation or alignment of the pattern used to fill identified pixels. Alignment can be used to lock a pattern to the top or bottom or a frame. For example, a light to dark pattern can be aligned to the bottom of the frame to create the visual impression of depth and will remain that way as the object grows. Next, the inset level for the ring is specified so that the processor knows where to draw that ring relative to the reference rectangle. Then, a fill pattern is identified which is used to fill in those pixels identified by the pixel identifier (described below). The fill pattern can, for example, be an index into a pattern lookup table. Pattern lookup tables are described in more detail in U.S. patent application Ser. No. 08/242,963 entitled "Pattern and Color Abstraction in a Graphical User Interface" which has been incorporated above. The interested reader is directed to this disclosure for more information on pattern lookups. Briefly, the pattern lookup table can include any number of multi-pixel patterns each associated with a pattern identifier. Each pixel which is identified in a ring specification by the pixel identifier is mapped to a part of the identified pattern stored in the pattern lookup table. The mapping of a particular pixel to the identified pattern is based upon the position of that pixel relative to the reference shape and the value of its corresponding ring flag (which determines the pattern's alignment for that pixel).

Lastly, each ring specification includes a pixel identifier parameter whose value indicates which pixels are to be turned on (i.e., filled) using the previously indicated fill pattern. For example, referring again to FIG. 5C, the value of the pixel identifier associated with the top of the outermost ring (i.e., the pixels associated with bits 0–15) could have hexadecimal value $1FFC to indicate that pixels 0–2 are off, 3–13 are on and 14–15 are off.

To provide a graphical example of how objects are created by traversing a list of ring specifications in a frame data structure, consider FIGS. 6A–6F (wherein 32 bit rings are illustrated). Therein, FIGS. 6A–6E illustrate a sequence of drawing events which result in the composite icon button frame of FIG. 6F. For example, Ring 0 has only a single pixel fill pattern (i.e., Black) and, therefore, a single ring specification which results in the ring shown in FIG. 6A being drawn. This ring specification could, for example, have a pixel identifier value of $7F7F7F7F, since each of the four absolute corner pixels (e.g., pixel 60) are not filled in.

Figure 6A:
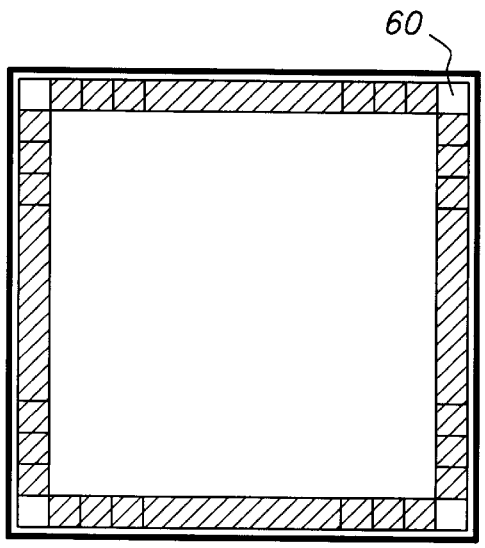
FIG. 6A illustrates a first ring of an exemplary frame.
Figure 6B:
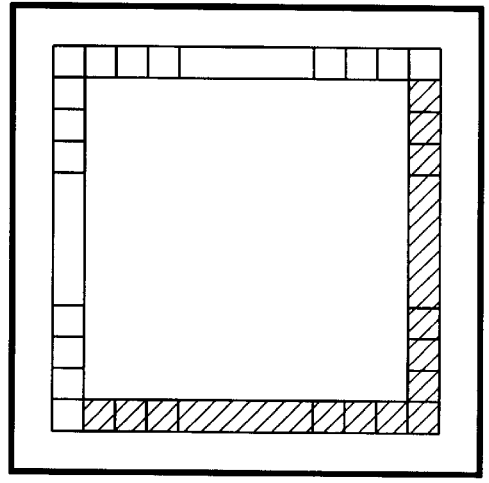
FIG. 6B illustrates a portion of a second ring of the same exemplary frame.
Figure 6C:
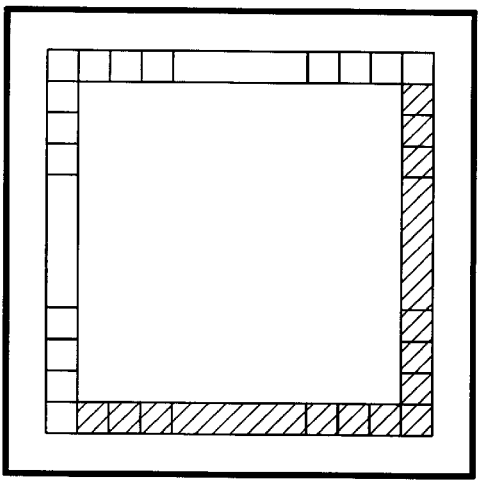
FIG. 6C illustrates another portion of the second ring of the exemplary frame.
Figure 6D:
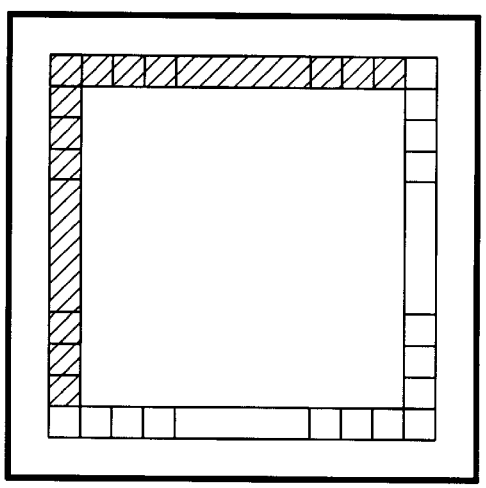
FIG. 6D illustrates yet another portion of the second ring of the exemplary frame.
Figure 6E:
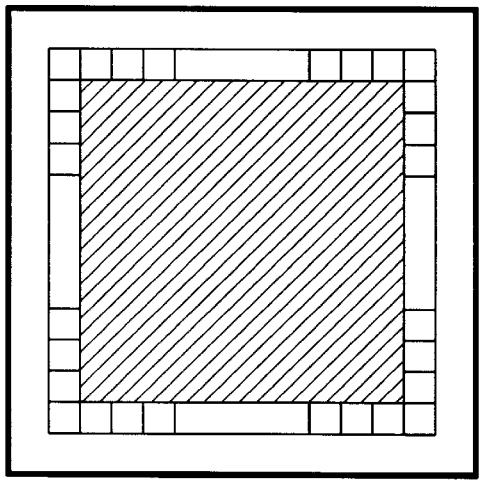
FIG. 6E illustrates the face portion of the composite object.
Figure 6F:
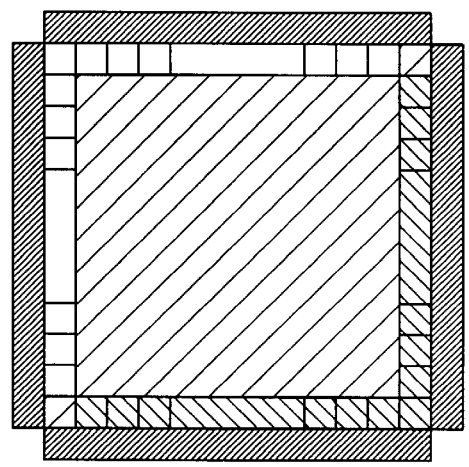
FIG. 6F illustrates the composite object comprising the parts illustrated in FIGS. 6A–6E.

FIG. 6B illustrates a ring portion rendered using a first of three ring specifications for Ring 1. Ring 1, according to this exemplary embodiment, would contain three ring specifications in each array since its pixels are filled using three different patterns. FIG. 6B could be associated with a ring specification having a pixel identifier with a value of $007FFF00. Similarly, the ring specifications associated with FIGS. 6C and 6D could be $00800080 and $FF00007F, respectively. FIG. 6E illustrates the last step of filling in the face of the frame.

Figure 6G:
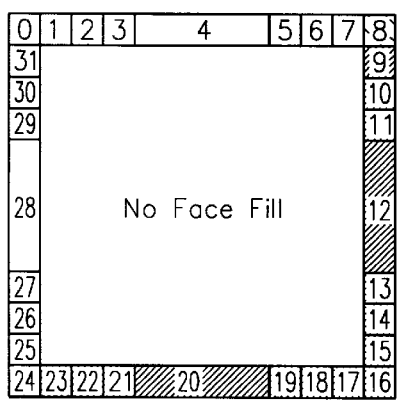
Figure 6I:
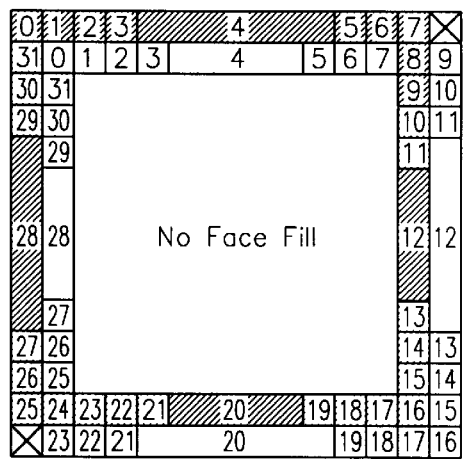
Figure 6I:
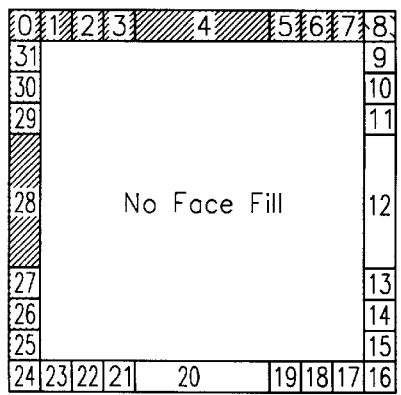

As mentioned above, the face of a frame need not be filled in, which feature can be used to provide various differently appearing objects. Consider FIGS. 6G–6I wherein each Figure provides a representation of a ring specification illustrated above the corresponding object as it would be drawn. In FIG. 6G, the illustrated ring specification creates the visual impression of a raised or embossed rectangular area. In FIG. 6H, the two ring frame creates a roughed-out rectangular area. In FIG. 6I, the ring specification shown can be used to create an indented rectangular area.

Figure 6J:
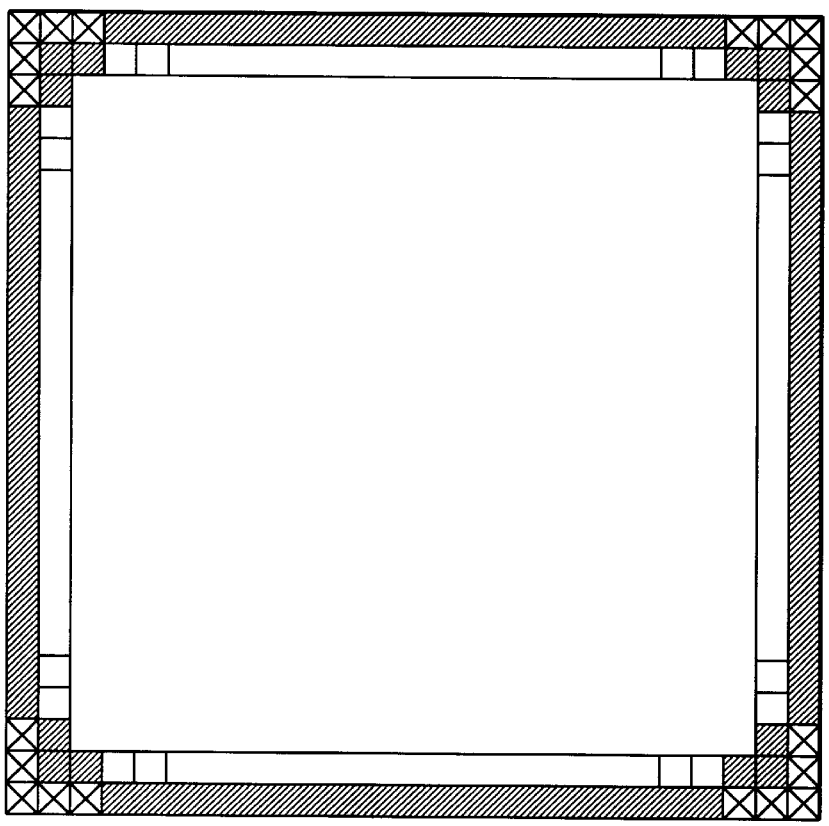
Figure 6J:
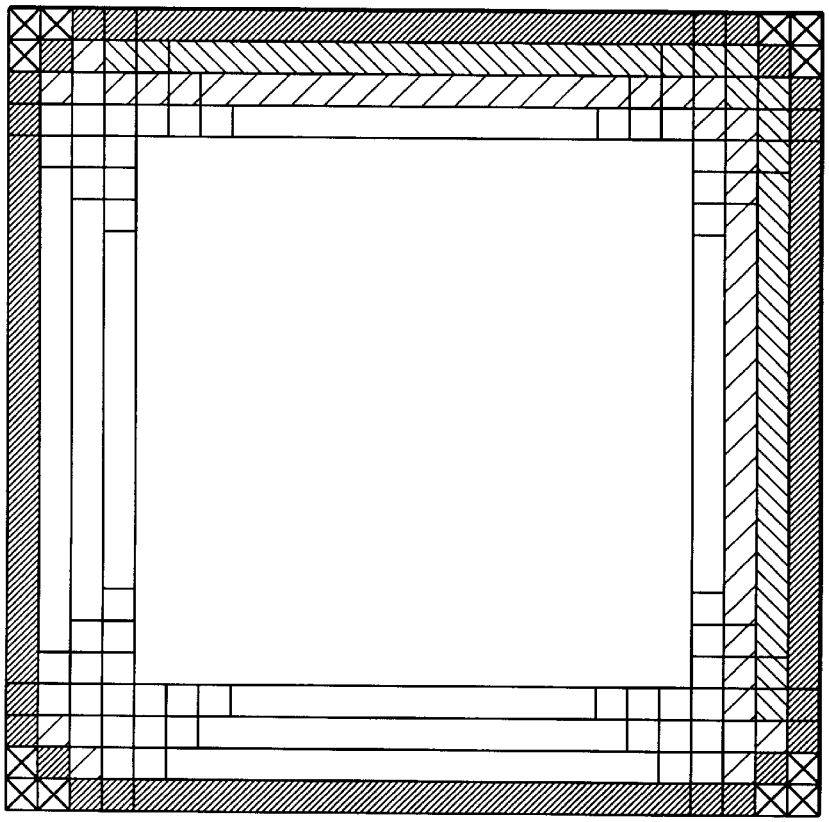

FIG. 6J illustrates two differently appearing buttons having the text "OK" drawn in their faces. The ring representations above each button exemplify how differently appearing objects can be created using the techniques described above by changing the data in the data structures. For example, the button on the right could be defined for systems which will exceed the color threshold, while the button on the left could be defined for systems having fewer color bits than the threshold.

Figure 7:
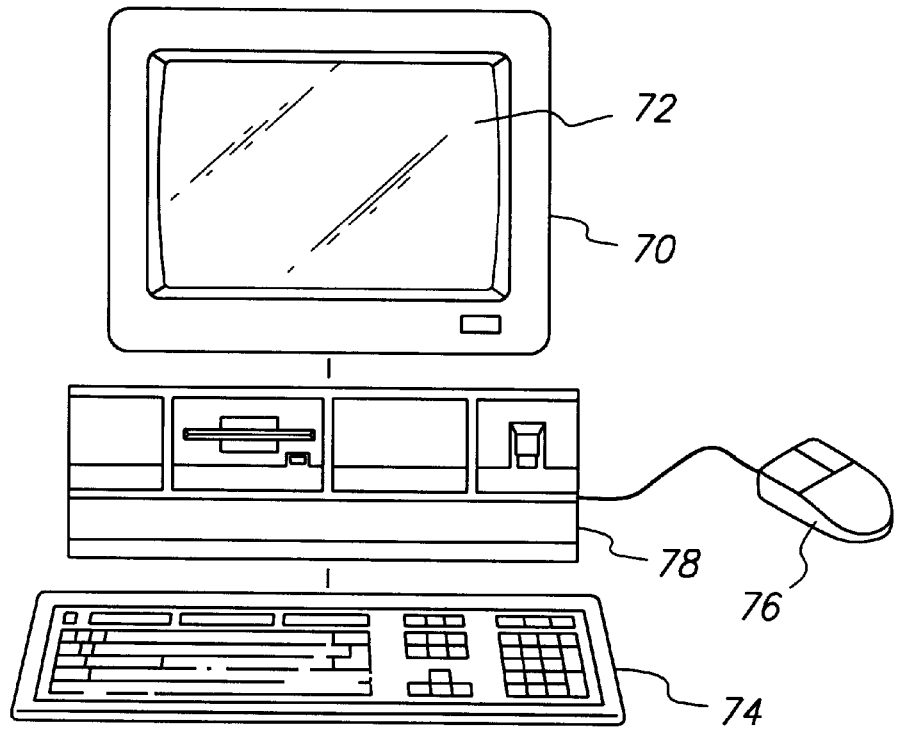
FIGS. 7 and 8 illustrate an exemplary computer system with which the present invention can be implemented.
Figure 8:
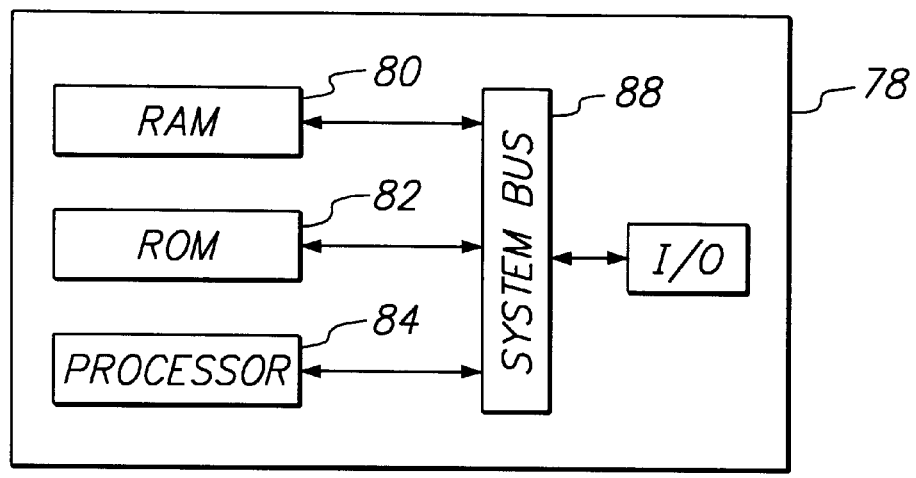

Those skilled in the art will appreciate that the foregoing described exemplary embodiments can be implemented using, for example, various types of computer systems. For example (with reference to FIGS. 7 and 8), such a computer system can have a monitor or display 70 having a screen 72 on which the graphical user interface is created. Input/output devices such as a keyboard 74 and pointing device 76 can be used to interact with the GUI. Box 78 include boards which accommodate functional units such as those illustrated by the block diagram of FIG. 8. Therein RAM 80, ROM 82, processor 84, and I/O 86 are all interconnected via system bus 88. The computer system can also have known storage devices (e.g., CD drives, floppy disk drives, hard drives, etc.) which can store and read programs and data structures used to implement the above-described techniques. These programs and data structures can be encoded on such computer-readable media.

Figure 9:
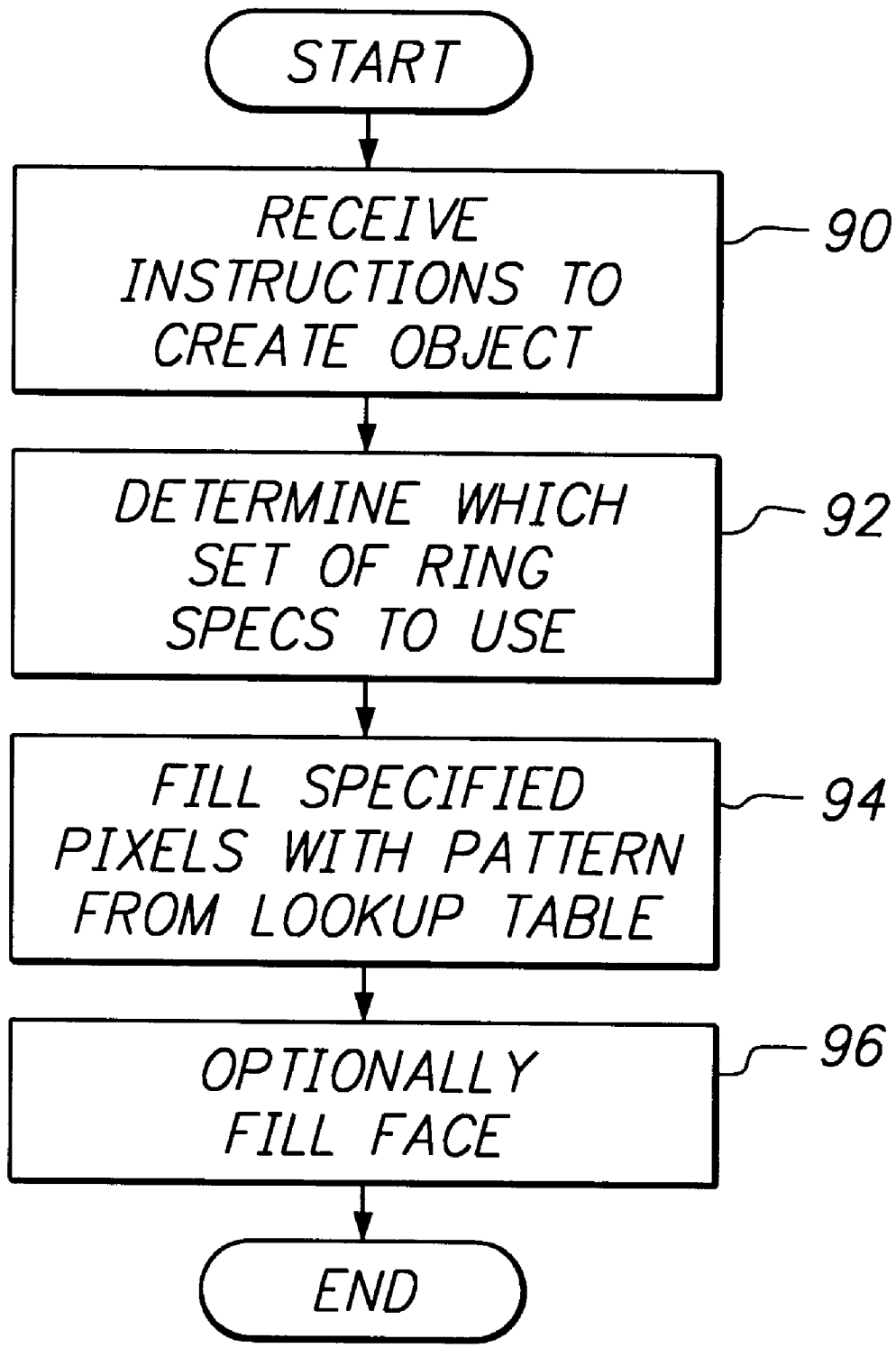
FIG. 9 is a flowchart depicting an exemplary method according to the present invention.

FIG. 9 illustrates an exemplary method in accordance with the present invention. Therein, the system's processor receives an instruction to create an object at step 90. By comparing the color threshold parameter in the corresponding frame data structure with the system's supported color set at step 92, the processor determines which set of ring specifications to use in drawing the object. Then, the processor iterates through each ring specification, filling identified pixels with the identified pattern taken from a pattern lookup table at step 94. After completing the rings, the processor will fill the face of the object with the specified pattern (if any), at step 96.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within e scope and spirit of the present invention as defined by the following claims.

What is claimed is:

1. A method for drawing an object on a display relative to a reference shape comprising the steps of:

defining a ring as a plurality of pixels including four sets of corner pixels, each set separated from adjacent sets by a side part having a number of side part pixels associated therewith;

receiving a data structure which includes at least one ring specification, said at least one ring specification used to draw a portion of at least one said ring on said display, each of said at least one ring specifications including:

a position relative to said reference shape;

a pattern identifier; and a value which identifies at least one of said plurality of pixels associated with said portion of said at least one ring; and drawing said object by filling in those pixels identified by said value using said pattern at said position for each said at least one ring specification.

2. The method of claim 1, wherein each of said corner pixels can be individually identified in said value but at least some of said side part pixels are jointly identified in said value.

3. The method of claim 1, wherein said number of side part pixels is variable based upon a size of said reference shape.

4. The method of claim 1, wherein said pattern identifier is an index to a pattern look-up table, which table includes a plurality of different patterns which can be retrieved to fill pixel spaces in said at least one ring.

5. The method of claim 1, wherein each set of corner pixels includes seven pixels.

6. The method of claim 1, wherein each set of corner pixels includes 15 pixels.

7. The method of claim 1, wherein said data structure further comprises:

at least one secondary ring specification including a second position, a second pattern and a second value.

8. The method of claim 7, wherein said step of drawing further comprises the steps of:

determining how many colors are available for drawing on said display; and drawing said object using either said at least one ring specification or said secondary ring specification based upon a result of said determining step.

9. The method of claim 1, wherein said step of receiving further comprises the step of:

including, within said at least one ring specification, a set of flags which indicate an orientation for drawing said pattern within each pixel identified by said value.

10. A computer-readable medium encoded with a data structure that can be used to draw an object on a display, said data structure comprising:

at least one object portion specification, each of said at least one object portion specifications including:

a position value;

a fill identifier; and a pixel identifier which identifies at least one of a plurality of pixels associated with a portion of said object which are to be filled as specified by said fill identifier at a position determined based upon a position of said at least one of said plurality of pixels within said pixel identifier and said position value.

11. The computer-readable medium of claim 10, wherein said pixel identifier identifies said at least one of said plurality of pixels using a numbering scheme that associates pixels within said portion of said object with bits in said pixel identifier, said bits including:

a plurality of sets of corner bits, each corner bit associated with an individual pixel within said portion of said object; and a plurality of side bits, each side bit having a number of side part pixels associated therewith.

12. The computer-readable medium of claim 11, wherein said number of side part pixels associated with a side bit is dependent upon a size of said portion of said object.

13. The computer-readable medium of claim 10, wherein each of a plurality of corner pixels can be individually identified in said pixel identifier but at least some side part pixels are jointly identified in said pixel identifier.

14. The computer-readable medium of claim 10, wherein said fill identifier is an index to a pattern look-up table, which table includes a plurality of different patterns which can be retrieved to fill pixel spaces in said portion of said object.

15. The computer-readable medium of claim 10, wherein said at least one object portion specification further comprises:

a secondary object portion specification including a second position identifier, a second pattern identifier and a second pixel identifier.

16. The computer-readable medium of claim 10, wherein said object portion specification further comprises:

a set of flags which indicate an orientation for drawing a pattern identified by said fill identifier within each pixel identified by said pixel identifier.

17. The computer-readable medium of claim 10, wherein said data structure includes at least two said object portion specifications having a same position value and a different fill identifier.

18. The computer-readable medium of claim 10, wherein said fill identifier identifies a color to be drawn for pixels identified by said pixel identifier.

19. A computer system comprising:

a display for outputting images;

a processor for processing an instruction to draw an object on said display using a data structure;

a computer-readable storage device for storing said data structure, wherein said data structure comprises:

a pixel identifier which identifies at least one of a plurality of pixels associated with a portion of said object which are to be filled, said plurality of pixels divided into corner pixels and side pixels, said corner pixels each having a bit associated therewith in said pixel identifier and said side pixels having associated therewith a bit within said pixel identifier for each side of said object.

20. The computer system of claim 19, wherein said data structure further comprises:

a second pixel identifier which identifies a different at least one of a plurality of pixels associated with a portion of said object which are to be filled, said plurality of pixels divided into corner pixels and side pixels, said corner pixels each having a bit associated therewith in said pixel identifier and said side pixels having associated therewith a bit within said pixel identifier for each side of said object.

21. The computer system of claim 20, wherein said processor decides which of said pixel identifier and said second pixel identifier to use in drawing said object on said display based upon a number of colors available in said computer system for drawing objects.

22. The computer system of claim 19, wherein said data structure further comprises:

a position identifier for indicating a position of said object relative to a reference.

23. The computer system of claim 19, wherein said data structure further comprises:

a fill identifier for identifying at least one of a pattern and color with which to fill pixels identified by said pixel identifier.

24. The computer system of claim 19, wherein said computer-readable storage device is a bank of semiconductor memory chips.

25. The computer system of claim 19, wherein said computer-readable storage device is a magnetic hard drive.

26. The computer system of claim 19, wherein said computer-readable storage device is an optical storage device.

27. The computer system of claim 19, wherein said processor is also for processing an instruction to change a size of said object, which change is performed by changing a number of pixels associated with at least one of said side bits.

28. A computer-readable medium encoded with a data structure that can be used to draw an object on a display, said data structure comprising:

at least one object portion specification, each of said at least one object portion specifications including:

a pixel identifier which identifies at least one of a plurality of pixels associated with a portion of said object which are to be filled, said plurality of pixels divided into corner pixels and side pixels, said corner pixels each having a bit associated therewith in said pixel identifier and said side pixels having associated therewith a bit within said pixel identifier for each side of said object.

29. The computer-readable medium of claim 28, wherein said data structure further comprises:

a position identifier for indicating a position of said object relative to a reference.

30. The computer-readable medium of claim 28, wherein said data structure further comprises:

a fill identifier for identifying at least one of a pattern and color with which to fill pixels identified by said pixel identifier.

31. A computer system comprising:

a display for outputting images;

a processor for processing an instruction to draw an object on said display using a data structure;

a computer-readable storage device for storing said data structure, wherein said data structure comprises:

at least one object portion specification, each of said at least one object portion specifications including:

a position value;

a fill identifier; and a pixel identifier which identifies at least one of a plurality of pixels associated with a portion of said object which are to be filled as specified by said fill identifier at a position determined based upon a position of said at least one of said plurality of pixels within said pixel identifier and said position value.

32. The computer system of claim 31, wherein said pixel identifier identifies said at least one of said plurality of pixels using a numbering scheme that associates pixels within said portion of said object with bits in said pixel identifier, said bits including:

a plurality of sets of corner bits, each corner bit associated with an individual pixel within said portion of said object; and a plurality of side bits, each side bit having a number of side part pixels associated therewith.

33. The computer system of claim 32, wherein said number of side part pixels associated with a side bit is dependent upon a size of said portion of said object.

34. The computer system of claim 31, wherein each of a plurality of corner pixels can be individually identified in said pixel identifier but at least some side part pixels are jointly identified in said pixel identifier.

35. The computer system of claim 31, wherein said fill identifier is an index to a pattern look-up table, which table includes a plurality of different patterns which can be retrieved to fill pixel spaces in said portion of said object.

36. The computer system of claim 31, wherein said at least one object portion specification further comprises:

a secondary object portion specification including a second position identifier, a second pattern identifier and a second pixel identifier.

37. The computer system of claim 31, wherein said object portion specification further comprises:

a set of flags which indicate an orientation for drawing a pattern identified by said fill identifier within each pixel identified by said pixel identifier.

38. The computer system of claim 31, wherein said data structure includes at least two said object portion specifications having a same position value and a different fill identifier.

39. The computer system of claim 31, wherein said fill identifier identifies a color to be drawn for pixels identified by said pixel identifier.

* * * * *